United States Patent [19]

King et al.

[11] 4,026,324

[45] May 31, 1977

[54] INJECTION VALVE

[75] Inventors: David Campbell King, Amherstview; John Anthony Kendall, Gananoque, both of Canada

[73] Assignee: Du Pont of Canada Limited, Montreal, Canada

[22] Filed: Jan. 16, 1976

[21] Appl. No.: 650,093

[30] Foreign Application Priority Data

Feb. 28, 1975 Canada .............................. 221181

[52] U.S. Cl. .............................. 137/605; 137/238; 137/608
[51] Int. Cl.² ........................................ F16K 19/00
[58] Field of Search .......... 137/604, 605, 606, 608, 137/238

[56] References Cited

UNITED STATES PATENTS 3,716,346  2/1973  Greene .......................... 137/605 X

*Primary Examiner*—Robert G. Nilson

[57] ABSTRACT

A valve for injecting or ejecting fluid to or from a fluid stream flowing in a pipe includes a valve body connected between abutting flanges in the pipe. The body has a through passage intersecting the pipe with seating assemblies located in each end of the through passage which cooperate with a stem assembly to provide communication between a port, the valve body and the pipe.

5 Claims, 5 Drawing Figures

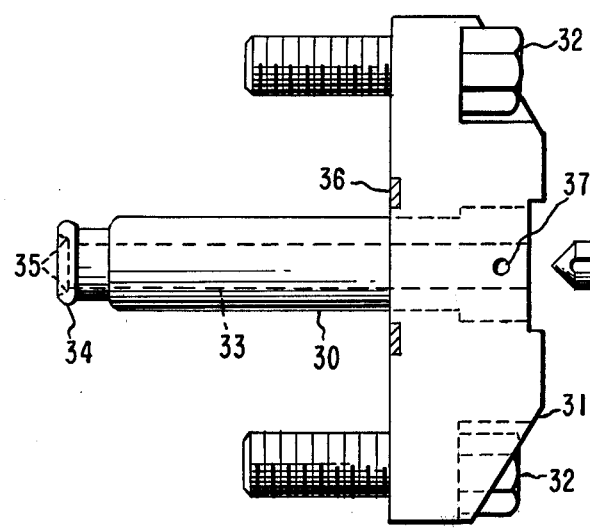
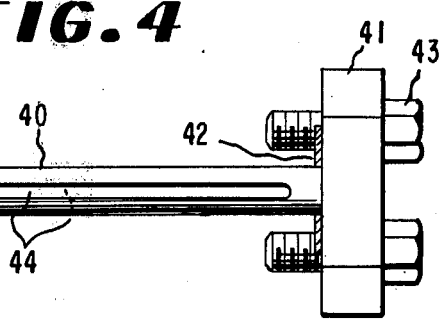
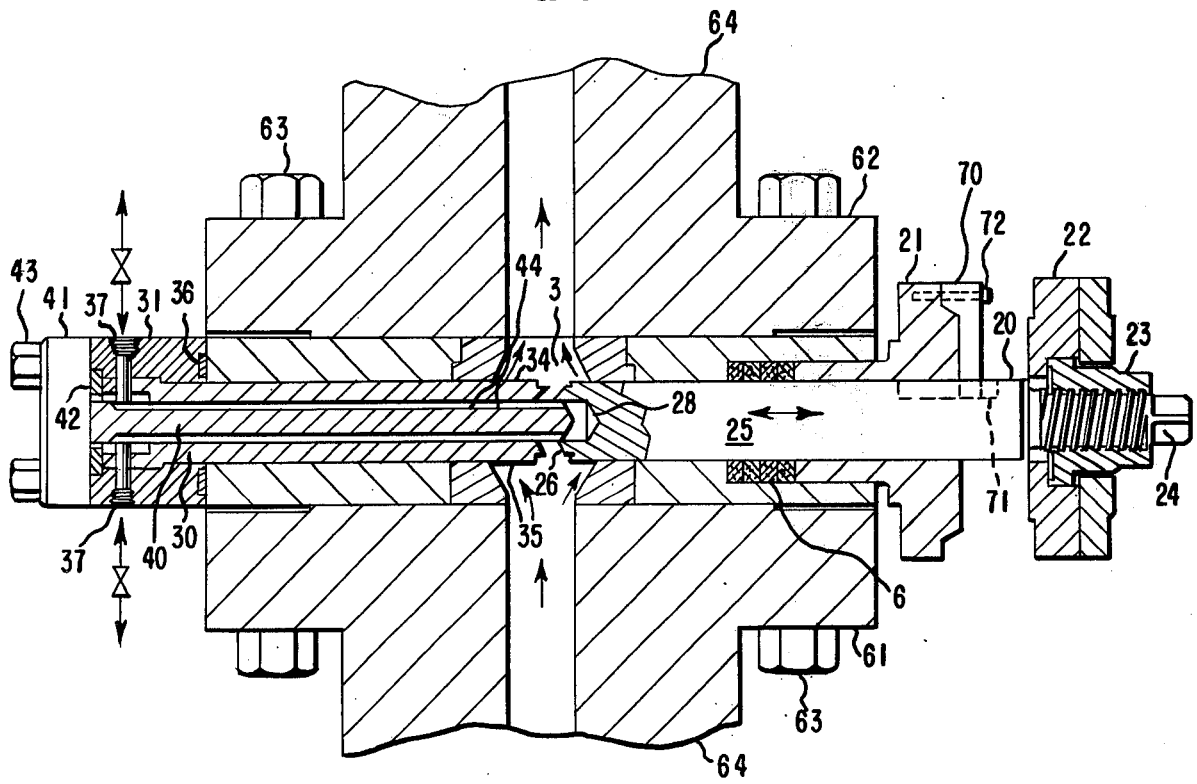

INJECTION VALVE

BACKGROUND OF THE INVENTION

This invention relates to a valve and more particularly to a valve which may be used to inject fluids into or sample fluid from a process fluid stream flowing in a tube or pipe such as that which might occur in a manufacturing process, for example, a process stream in a continuous polymerization line for the manufacture of thermoplastic polymer.

The prior art in the field of valve design and fabrication teaches a number of valves which are useful for the regulation of fluid transfer to and from a variety of manufacturing operations. However, in certain kinds of manufacture, for example the production of thermoplastic polymers, the materials of manufacture are susceptible to degradation during periods in which they are not being actively processed, for example, during a period when such materials might be held up within a valve when the valve is temporarily closed.

It is, therefore, an object of this invention to provide a valve which may be used for injecting fluid additives into or sampling fluid from a flowing stream in a manufacturing process, in which the valve closure means is located in the flowing process stream.

It is another object of this invention to provide a valve which may be installed easily in tubing or piping used in a manufacturing process, for example in a continuous polymerization line for the manufacture of thermoplastic polymer.

It is another object of this invention to provide a valve which may be purged by a cleaning fluid with the closure means of the valve in the closed position, located in a flowing process stream.

It is another object of this invention to provide a valve which may be partially disassembled for cleaning without shutting down the manufacturing process in which the valve operates.

It is yet another object of this invention to provide a valve having sealing seats which may be removed from the valve body for cleaning.

SUMMARY OF THE INVENTION

With these and other objects in view the present invention provides a valve for injecting or ejecting fluid to or from a fluid stream flowing in a tube or pipe sections joined by abutting flanges comprising a valve body, two seating assemblies and a ported stem assembly, said valve body being adapted for connection between abutting flanges of a pipe and having a plenum chamber in communication with the pipe, said plenum chamber being intersected by a bore passing completely through the valve body, said bore housing through its opposite ends an inserted portion of each of the two seating assemblies, said inserted portion of each of the two seating assemblies having a seating surface at the end thereof, the first seating assembly being adapted to be moved into and out of the bore such that its seating surface meets with and separates from the seating surface of the second seating assembly inside the plenum chamber to close and to open the valve respectively, the second seating assembly having a hollow center and at least one port leading into said hollow center, said hollow center housing an inserted portion of the ported stem assembly, said ported stem assembly having at least one port extending along the stem from a position adjacent to the port in said second seating assembly to a position adjacent the seating surfaces of the seating assemblies to provide with the valve is in the open position, fluid flow communication between the port in said second seating assembly and the plenum chamber in communication with the pipe.

In one embodiment of the present invention there are two ports in the second seating assembly and two ports along the ported stem assembly, said two ports along the ported stem assembly extending from a position adjacent the respective two ports in the second seating assembly to the end of the inserted portion of the ported stem assembly.

In another embodiment of the present invention with the valve in the closed position, there is a gap between the end of the inserted portion of the ported stem assembly and the end of the inserted portion of the first seating assembly adapted to provide fluid flow communication between the two ports in the ported stem assembly through the gap.

BRIEF DESCRIPTION OF THE DRAWINGS

FIG. 3 is a front view of the second seating assembly.
FIG. 4 is a front view of the ported stem assembly.
FIG. 6 is a plan view of the complete valve assembly installed on line between abutting flanges of pipe.

DETAILED DESCRIPTION OF THE PREFERRED EMBODIMENT

Figure 5:
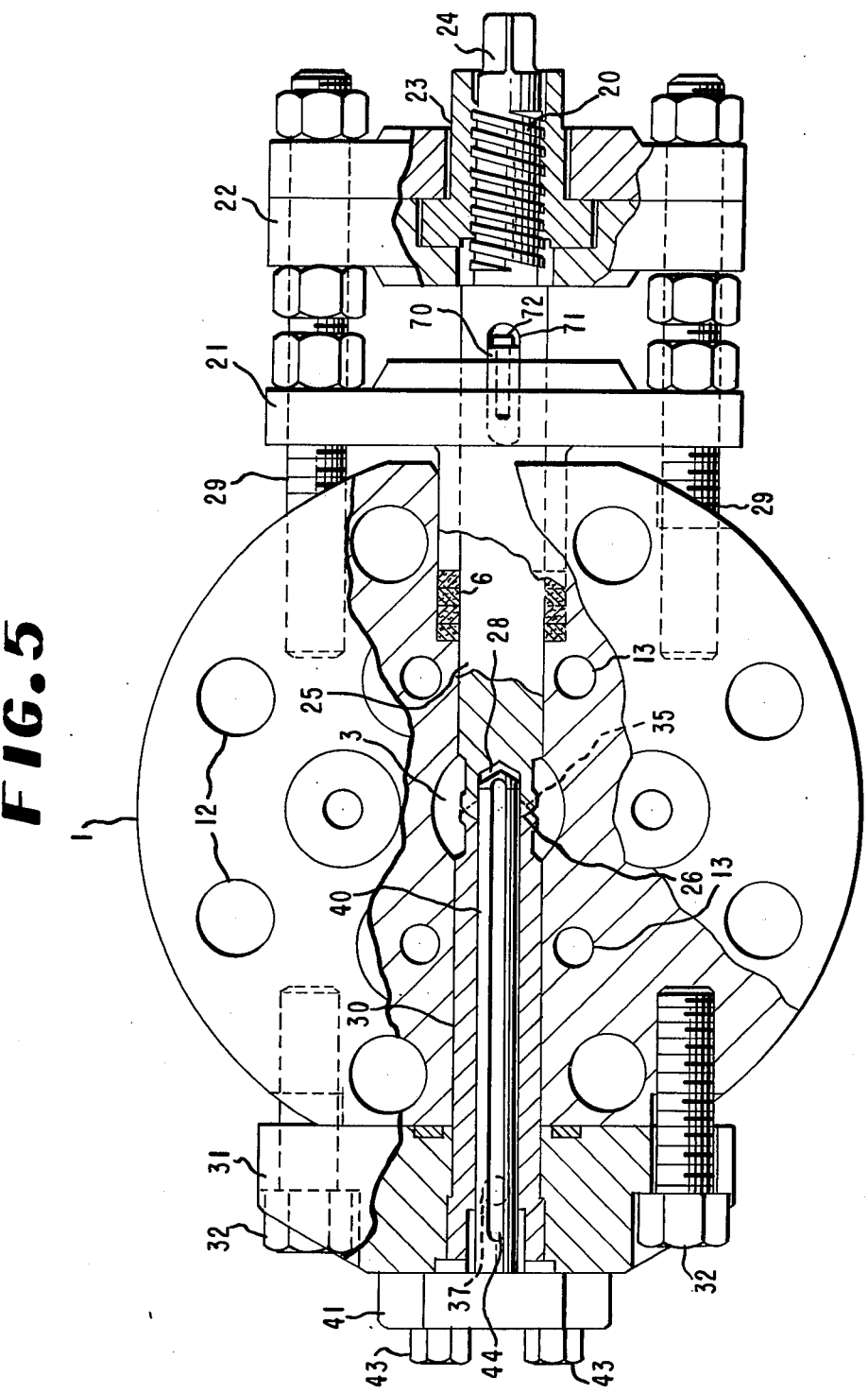
FIG. 5 is a front view, partly in section, of the complete valve.

A preferred embodiment of this invention which is fully depicted in FIGS. 5 and 6 is conveniently described in parts with the aid of FIGS. 1 to 4.

Figure 1:
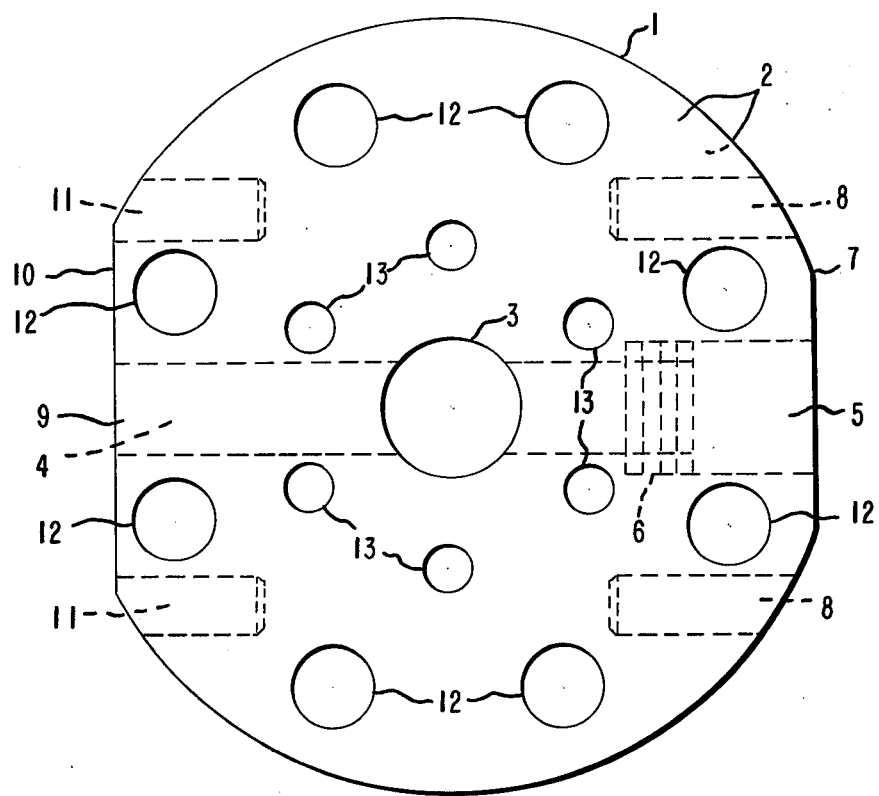
FIG. 1 is a front view of the valve body.

FIG. 1 illustrates a disc shaped valve body 1 having two flat faces 2, a plenum chamber 3 within the valve body 1 that opens onto both faces 2, and a bore 4 passing completely through the diameter of the valve body 1, intersecting the plenum chamber 3.

Figure 2:
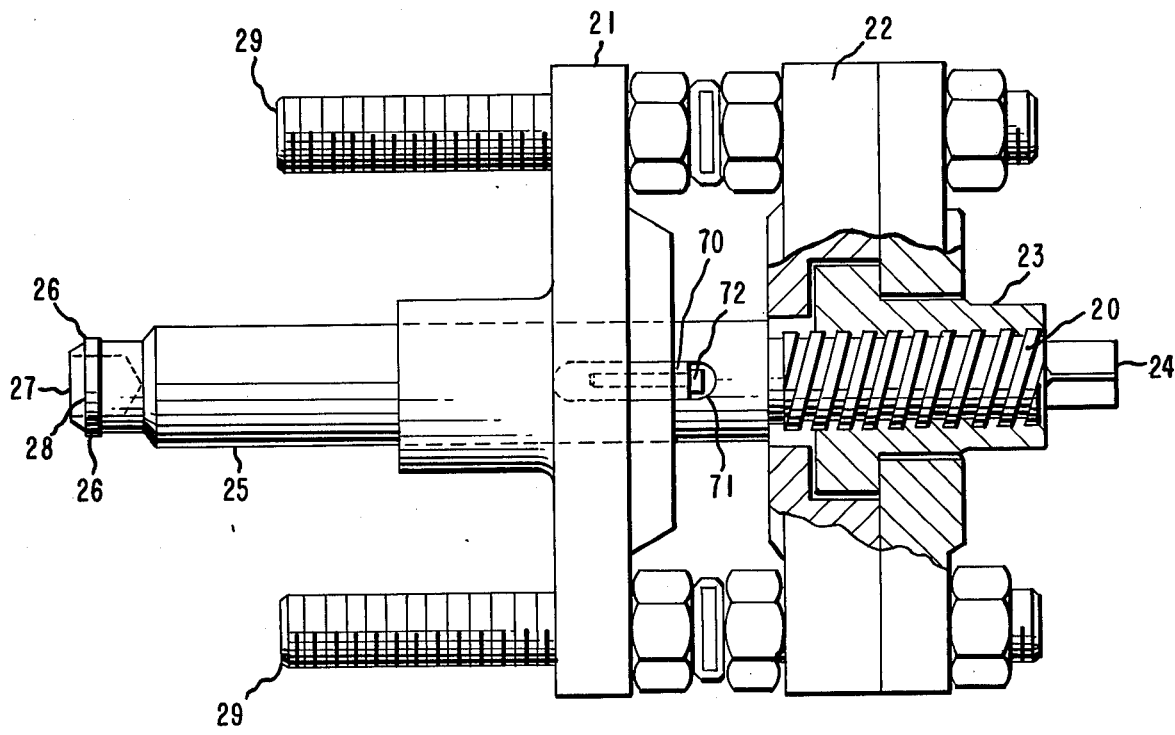
FIG. 2 is a front view of the first seating assembly.

One end 5 of the bore 4 and the adjoining positions of the valve body 1 are adapted to receive the first seating assembly (not shown in FIG. 1, but illustrated in FIG. 2). To that purpose the bore 4 is enlarged near end 5 and fitted with packing 6, and a flat face 7 and bolt holes 8 are provided in valve body 1 to facilitate attachment thereto of the first seating assembly.

The other end 9 of the bore 4 and the adjoining positions of valve body 1 are adapted to receive the second seating assembly (not shown in FIG. 1, but illustrated in FIG. 3). The bore 4 near end 9 is not enlarged, but a flat face 10 and bolt holes 11 are provided in valve body 1 to facilitate attachment thereto of the second seating assembly.

Also shown in FIG. 1 are bolt holes 12 in valve body 1 for the attachment thereto of abutting flanges (indicated as 61 and 62 in FIG. 6) of a pipe, and fluid transfer holes 13 in valve body 1 for the conduction of a heating medium to warm the valve body 1.

FIG. 2 illustrates the first seating assembly which includes a stem 20 which passes through a packing gland 21, a bearing plate 22 and a nut 23 and terminates at one end in head 24 and at the other end in insertable portion 25. Female threads in nut 23 are adapted to cooperate with male threads on the portion adjacent head 24 of stem 20 to move the stem 20 in or out relative to the packing gland 21 when the nut 23 is turned, as with a wrench, stem 20 being prevented from rotational movement by key 70 in keyway 71 and key 70 being held in place by pin 72 (shown also in FIG. 6). The insertable portion 25 of stem 20 is adapted to fit in surface to surface contact within the bore (shown as 4 in FIG. 1) and to seal against the packing (shown as 6 in FIG. 1). A seating surface 26 is provided about the end 27 of the insertable portion 25 of the stem 20 and in this embodiment the end 27 is also shallowly countersunk with a hole 28 adapted to receive the end of a ported stem (shown as 40 in FIG. 4) and to provide mutual communication between the stem ports (shown as 44 in FIG. 4).

Also shown in FIG. 2 are the bolts 29 which attach the first seating assembly to the valve body (shown in FIG. 1).

FIG. 3 illustrates the second seating assembly which includes a stem cylinder 30 in a housing 31 and bolts 32 to attach the second sealing assembly to the valve body (shown in FIG. 1). The stem cylinder 30 has a hollow center 33 adapted to receive the ported stem (shown in the exploded view, FIG. 4, as 40) in slideable surface to surface contact. The insertable end 34 of the stem cylinder 30 is provided with a seating surface 35 adapted in this embodiment to seat in female connection with the seating surface of the first seating assembly (shown as 26 in FIG. 2). Also in FIG. 3 is gasket 36 about the stem cylinder 30 which facilitates the sealing of the second seating assembly against the valve body (shown in FIG. 1) after it is connected thereto with bolts 32 provided for that purpose. In this embodiment two ports 37 are illustrated in housing 31 which lead into the hollow center 33 to communicate with two stem ports (shown as 44 in FIG. 4).

FIG. 4 illustrates the ported stem assembly comprising the ported stem 40, an extraction plate 41, gasket 42 about the ported stem 40 and bolts 43 adapted to attach the extraction plate 41 of the ported stem assembly onto the housing 31 (shown in FIG. 3) of the second seating assembly. The ported stem 40, in this embodiment, is fitted with two ports 44. These ports 44 are grooves cut in the ported stem 40 running from a portion of the ported stem 40 near the extraction plate 41 along the full length of said ported stem 40. Each stem port 44 is aligned to lie directly beneath a corresponding port 37 (shown in FIG. 3) of the second seating assembly and to be in separate communication with such port 37.

FIG. 5 illustrates the assembled valve wherein the two seating assemblies are bolted onto the valve body 1 and the ported stem assembly is bolted onto the housing 31 of the second seating assembly. The seating surface 26 of the stem 20 of the first seating assembly is shown to be seated in male-female connection with the seating surface 35 of the stem cylinder 30 of the second seating assembly inside plenum chamber 3; i.e. the valve is shown in the closed position.

The other numbered parts illustrated in FIG. 5 are as designated hereinbefore in the description of FIGS. 1 to 4.

FIG. 6 illustrates the valve installed on line between the abutting flanges 61 and 62 of pipe 64. The valve body 1 is shown to be attached to the flanges 61 and 62 by means of bolts 63. The plenum chamber 3 is adapted to allow the flow of fluids through the pipe 64 and about the seating surfaces 26 and 35 of the first and second seating assemblies respectively whether these seating surfaces are in the open position shown or are in the closed position as shown in FIG. 5.

The other numbered parts illustrated in FIG. 6 are as designated hereinbefore in the description of FIGS. 1 to 4.

The operation of the valve may be conveniently described with the aid of FIGS. 5 and 6. In operation the stem ports 44 of the ported stem 40 may be exposed to the plenum chamber 3 by turning nut 23 in one direction causing the stem 20 to be withdrawn and thereby separating the seating surface 26 from seating surface 35. Turning nut 23 in the opposite direction results in the reversed motion of stem 20 and the seating surfaces 26 and 35 are brought together thereby enclosing the ported stem 40 and the stem ports 44. In this manner the valve may be opened over a range of settings or closed altogether.

The valve may be used to inject additives into the process by injecting the additives through the ports 37 to the stem ports 44. The rate of addition may then be controlled by adjustment of nut 23.

In a similar fashion, by applying a vacuum to the ports 37 the valve may be used to remove sample material from the process.

To purge the stem ports 44 the seating surfaces 26 and 35 are brought together as described above i.e. closed and one port 37 is connected to a source of purging fluid under pressure while the other port 37 is connected to a source vacuum. The purging fluid then enters one port 37 passes along the adjoining stem port 44 to the countersunk hole 28, passes through the gap between the end of ported stem 40 and the bottom of hole 28 and then passes back along the other stem port 44 to be exhausted to waste at the other port 37.

It will be appreciated that it is not necessary to have the countersunk hole 28 in the end 27 of stem 20 in order to allow purging of the stem ports 44 as described above. For example, if, with the seating surfaces 26 and 35 in the closed position, the end of ported stem 40 terminates just short of the end 27 of stem 20 to provide a gap therebetween, such purging may be carried out in the absence of the countersunk hole 28. In this case, however, alignment of stem 20 with stem cylinder 30 may be unsatisfactory, as the presence of the end of ported stem 40 in countersunk hole 28 is required to ensure that stem 20 and stem cylinder 30 are in alignment.

If it is desired e.g. for cleaning purposes, the seating surface 26 of stem 20 of the first seating assembly may be rotated respective to and in contact with the seating surface 35 of the stem cylinder 30 of the second seating assembly. This may be accomplished by loosening pin 72 and removing key 70 from keyway 71 and then turning head 24 of stem 20 with a wrench.

The novel construction of the valve of the present invention facilitates the removal of the ported stem assembly without process shutdown. The seating surfaces are closed to isolate the ported stem 40 from the process and then the whole ported stem assembly may be easily unbolted and removed. This feature allows the ported stem 40 and the inner surface of the stem cylinder 30 to be more thoroughly cleaned than may be accomplished by purging alone. Furthermore the ported stem 40 may be repaired or simply replaced, perhaps by another stem having ports of different design, size or arrangement.

The above construction of the valve also permits the removal of the seating assemblies during periods of temporary process shutdown. This feature exposes substantially all surfaces of the valve, including both seating surfaces, to cleaning, repair or replacement. It will be appreciated that valve components may be replaced with others of somewhat different design to achieve a variety of purposes. Therefore the valve is capable of great versatility in construction by simple substitution of parts.

We claim:

1. A valve for communicating to a fluid stream flowing in pipe sections joined by abutting flanges comprising:
   a valve body adapted for connection between said abutting flanges and having a plenum chamber in communication with said pipe sections, said plenum chamber being intersected by a bore passing completely through the valve body from one end to the other;
   a first seating assembly positioned in one end of said bore, said first seating assembly being adapted to be moved into and out of the bore and having a seating surface to close and to open the valve;
   a second seating assembly positioned in the other end of said bore, said second seating assembly having a hollow center and at least one port leading into said hollow center, the inserted portion of each of the two seating assemblies having a seating surface at the end thereof; and
   a ported stem assembly housed in the hollow center of the second seating assembly, said ported stem assembly having at least one port extending along the stem from a position adjacent to the port in said second seating assembly to a position adjacent the seating surfaces of the seating assemblies to provide when the valve is in the open position, fluid flow communication between the port in said second seating assembly and the plenum chamber in communication with the pipe sections.

2. The valve according to claim 1 in which there are two ports in the second seating assembly and two ports along the ported stem assembly.

3. The valve according to claim 2 in which the two ports in the ported stem assembly extend along the stem from a position adjacent the respective two ports in said second seating assembly to the end of the inserted portion of the stem assembly.

4. The valve according to claim 3 in which with the valve in the closed position, there is a gap between the end of the inserted portion of the ported stem assembly and the end of the inserted portion of the first seating assembly adapted to provide fluid flow communication between the two ports in the ported stem assembly through said gap.

5. The valve according to claim 4 wherein there is a countersunk hole in the end of the inserted portion of the first seating assembly, said hole housing the end of the inserted portion of the ported stem assembly, and wherein said gap is between the end of the inserted portion of the ported stem assembly and the bottom of said hole.

* * * * *